US007577344B2

(12) United States Patent
Kakiuchi

(10) Patent No.: US 7,577,344 B2

(45) Date of Patent: Aug. 18, 2009

(54) LIGHT-SHIELDING DEVICE FOR ORAL PHOTOGRAPHY

(75) Inventor: Shinichi Kakiuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/027,693

(22) Filed: Feb. 7, 2008

(65) Prior Publication Data

US 2008/0131105 A1 Jun. 5, 2008

Related U.S. Application Data

(62) Division of application No. 11/058,296, filed on Feb. 16, 2005, now abandoned.

(30) Foreign Application Priority Data

Feb. 23, 2004 (JP) .......................... P2004-045930

(51) Int. Cl.
*A61B 1/04* (2006.01)
*A61B 1/06* (2006.01)

(52) U.S. Cl. ......................... 396/16; 362/573; 362/804; 362/351; 348/66

(58) Field of Classification Search ................. 396/155, 396/198, 199, 267, 544, 429; 348/77, 66, 348/375; 362/572, 573, 804, 351; 433/31
See application file for complete search history.

(56) References Cited

U.S. PATENT DOCUMENTS 4,921,344 A * 5/1990 Duplantis .................... 396/16

FOREIGN PATENT DOCUMENTS

| | | |
|---|---|---|
| JP | 4-67023 | 3/1992 |
| JP | 4-90753 | 3/1992 |
| JP | 6-407 | 1/1994 |
| JP | 8-251457 | 9/1996 |
| JP | 11-299734 | 11/1999 |
| JP | 2001-258044 | 9/2001 |
| JP | 2001-356403 | 12/2001 |
| JP | 2002-250969 | 9/2002 |
| JP | 2003-121898 | 4/2003 |

OTHER PUBLICATIONS

English language Abstract of JP 2002-250969, Sep. 6, 2002.
English language Abstract of JP 8-251457, Sep. 27, 1996.
English language Abstract of JP 2001-258044, Sep. 21, 2001.
English language Abstract of JP 11-299734, Nov. 2, 1999.
English language Abstract of JP 4-67023, Mar. 3, 1992.
English language Abstract of JP 2003-121898, Apr. 23, 2003.
English language Abstract of JP 4-90753, Mar. 24, 1992.
English language Abstract of JP 2001-356403.

* cited by examiner

*Primary Examiner*—W. B. Perkey
*Assistant Examiner*—David M. Schindler
(74) *Attorney, Agent, or Firm*—Greenblum & Bernstein, P.L.C.

(57) ABSTRACT

An illuminating device is used for oral photography and is connectable to a lens barrel provided on a camera. The illuminating device includes a light-emitting surface that has an arc shape, so that a periphery of a mouth being under a nose of a person being photographed can be exclusively illuminated.

4 Claims, 4 Drawing Sheets

20
12
34
36
30
35
16
22

14
20
22
11
10
12
32

LIGHT-SHIELDING DEVICE FOR ORAL PHOTOGRAPHY

CROSS REFERENCE TO RELATED APPLICATIONS

This application is a Divisional application of pending U.S. patent application Ser. No. 11/058,296, filed on Feb. 16, 2005, which claims priority to Japanese Application No. 2004-045930, filed Feb. 23, 2004, the disclosures of which are expressly incorporated by reference herein in their entireties.

BACKGROUND OF THE INVENTION

1. Field of the Invention

The present invention relates to an illuminating device for oral use, especially for photographing or observing a row of human teeth for dental care, and also relates a light-shielding device used with an illuminating device.

2. Description of the Related Art

When a row of human teeth is photographed close up for dental care, a ring flash is generally used because it is suitable for close-up photography. A ring flash is usually attached to the periphery of a lens barrel of a photographing device, and emits illuminating light toward a periphery of a mouth of a patient or a person being photographed.

However, when a ring flash having an O-shaped illuminating surface is used for photographing or observing a row of teeth, the whole face of the patient can be illuminated, and the illuminating light can enter the eyes or heat the face of the patient. Further, the ring flash may contact the face of the patient because the row of teeth is generally photographed close up, and this can give the patient an unpleasant feeling.

SUMMARY OF THE INVENTION

Therefore, an object of the present invention is to provide an illuminating device that can emit illuminating light exclusively toward a periphery of a mouth being under a nose of a patient, when a row of teeth is photographed close up or observed, and to provide a light-shielding device used with a conventional illuminating device.

An illuminating device according to the present invention, is used for oral photography and is connectable to a lens barrel provided on a camera. The illuminating device includes a light-emitting surface that has an arc shape so that a periphery of a mouth being under a nose of a person being photographed, can be exclusively illuminated.

An illuminating device according to another aspect of the present invention, is connectable to a lens barrel provided on a camera, and includes a light-emitting surface that has an arc shape having an opening.

An illuminating device according to another aspect of the present invention, is used for oral photography and is connectable to a lens barrel provided on a camera. The illuminating device includes an illuminating device body that has an opening to prevent the illuminating device from interfering with a nose of a person being photographed.

A light-shielding device according to the present invention, is detachable to an illuminating device for oral photography. The light-shielding device includes a light-shielding surface and a light-transmitting member. The light-shielding surface shields illuminating light emitted by the illuminating device. The light-transmitting member transmits the illuminating light emitted by the illuminating device, and has a light-transmitting surface having an arc shape, so that a periphery of a mouth being under a nose of a person being photographed can be exclusively illuminated.

A light-shielding device according to another aspect of the present invention, is attachable to an illuminating device for oral photography. The light-shielding device includes a light-shielding surface and a light-transmitting member. The light-shielding surface shields illuminating light emitted by the illuminating device. The light-transmitting member transmits the illuminating light emitted by the illuminating device, and has a recessed light-shielding surface to prevent the light-shielding device from interfering with a nose of a person being photographed.

An illuminating device according to another aspect of the present invention, is used for oral photography and is connectable to a lens barrel provided on a camera. The illuminating device includes a light-emitting surface that has an arc shape.

BRIEF DESCRIPTION OF THE DRAWINGS

The present invention will be better understood from the description of the preferred embodiment of the invention set forth below together with the accompanying drawings, in which.

DESCRIPTION OF THE PREFERRED EMBODIMENTS

Hereinafter, the preferred embodiments of the present invention are described with reference to the attached drawings.

Figure 1:
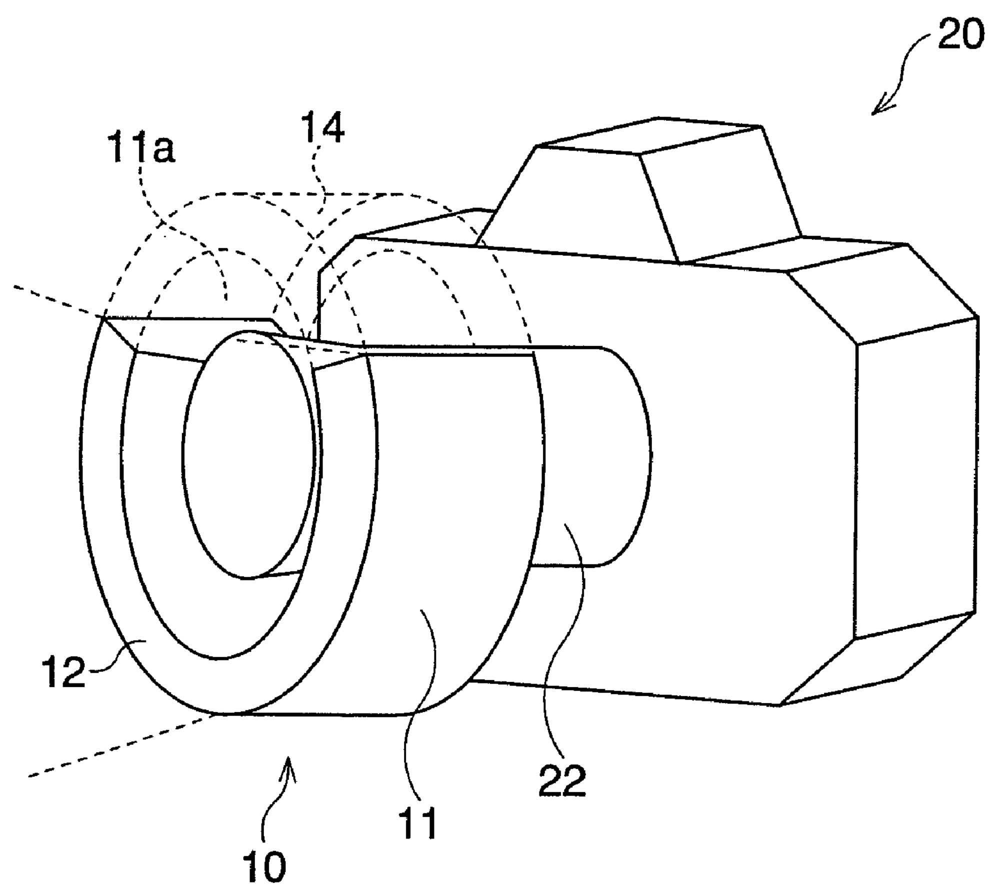
FIG. 1 is a perspective view of an illuminating device and a digital camera of the first embodiment.
Figure 2:
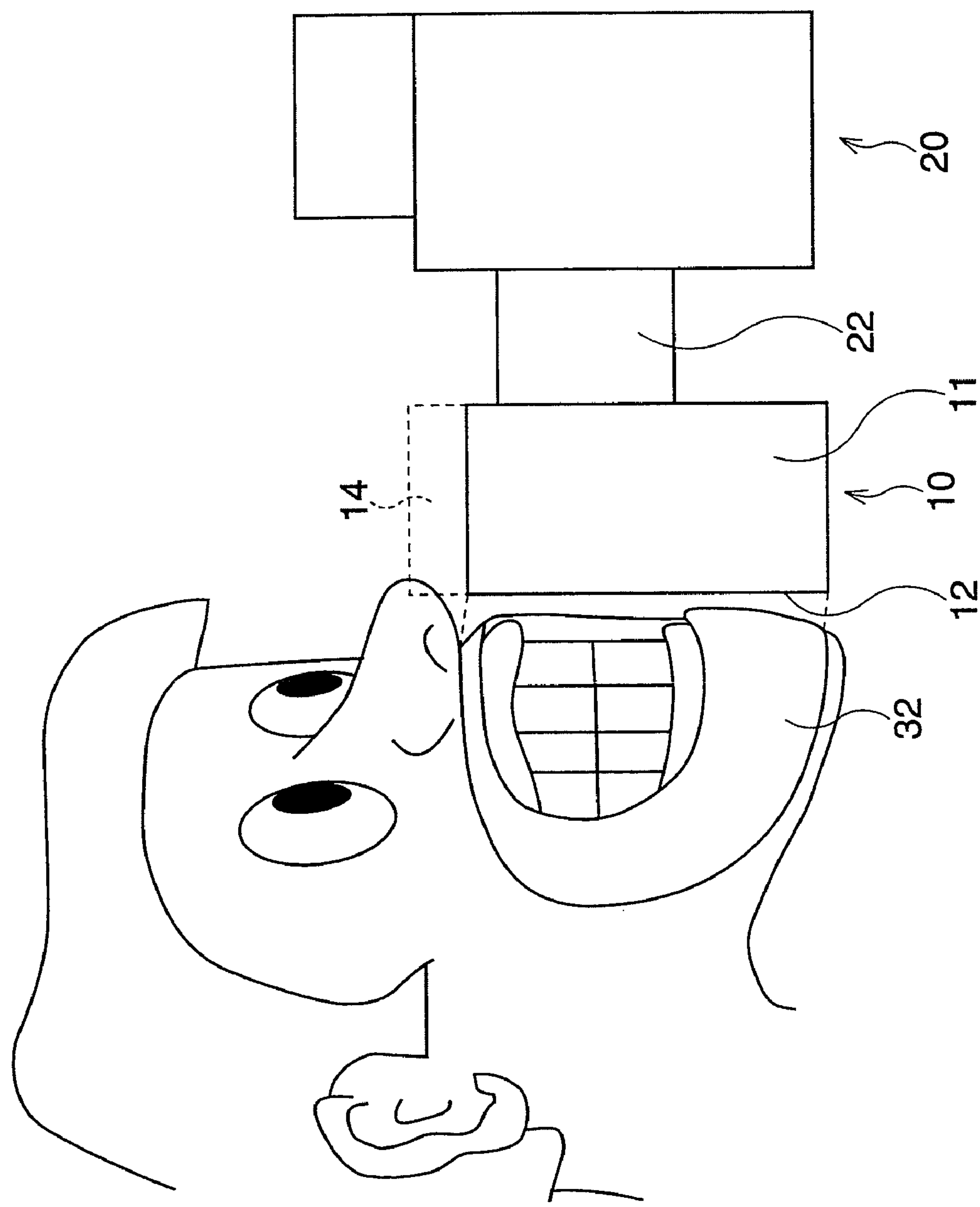
FIG. 2 is a side view of the illuminating device and the digital camera of the first embodiment.

FIG. 1 is a perspective view of an illuminating device and a digital camera of the first embodiment of the present invention. FIG. 2 is a side view of the illuminating device and the digital camera.

The illuminating device 10 is detachably connected to the periphery of a lens barrel 22 including a photographing optical system (not shown) of the digital camera 20, when it is used for oral photography. The illuminating device 10 has an illuminating device body 11 that has a cylindrical shape having a section 14 removed, and a light-emitting surface 12 having an arc shape. The illuminating device 10 has an LED as a light source. Its shape and the power source are different from conventional illuminating devices having an O-shaped light-emitting surface and a conventional electric power source. The illuminating device 10 is connected to a regulator (not shown) for adjusting the amount of illuminating light emitted by the light-emitting surface 12.

The removed section 14 is designed to avoid contact between the illuminating device 10 and a nose of a patient, and emission of illuminating light toward the eyes of a patient when the face of the patient is photographed close up or observed for oral photography (see FIG. 2). By removing the section 14, the illuminating device body 11 has an opening 11*a* in the upper side. Therefore, when the illuminating device 10 is used for close-up photography or observation, the nose of the patient can be positioned in the opening 11*a* and only an illuminating area 32 under the nose and including the mouth of the patient, is illuminated by illuminating light emitted by the C-shaped light-emitting surface 12 having an opening, which is an O-shaped light-emitting surface having a part removed.

In the first embodiment mentioned above, the illuminating device can exclusively illuminate a periphery of a mouth being under a nose of a person being photographed, and can avoid interfering with the face of the patient when a close-up photography, or close observation is carried out.

The three dimensional shape of the illuminating device 10 and the plane shape of the light-emitting surface 12 are not limited to the shapes shown in the first embodiment, and they can be modified according to the subjects, the shape of the illuminating area 32 and so on. For example, so long as there is no contact with the patient, the section 14 can be small and the illuminating device 10 can be almost fully ring-shaped. Further, although the plane shape of the light-emitting surface 12 is preferably an arc shape as in the first embodiment for avoiding contact with the face of the patient, it is not limited to that in the embodiment so long as it exclusively emits illuminating light to a periphery of the mouth, and not the nose or eyes of the patient.

The light source of the illuminating device 10 is not limited to being an LED, although the LED is preferable because controlling the amount of illuminating light is easy.

Figure 3:
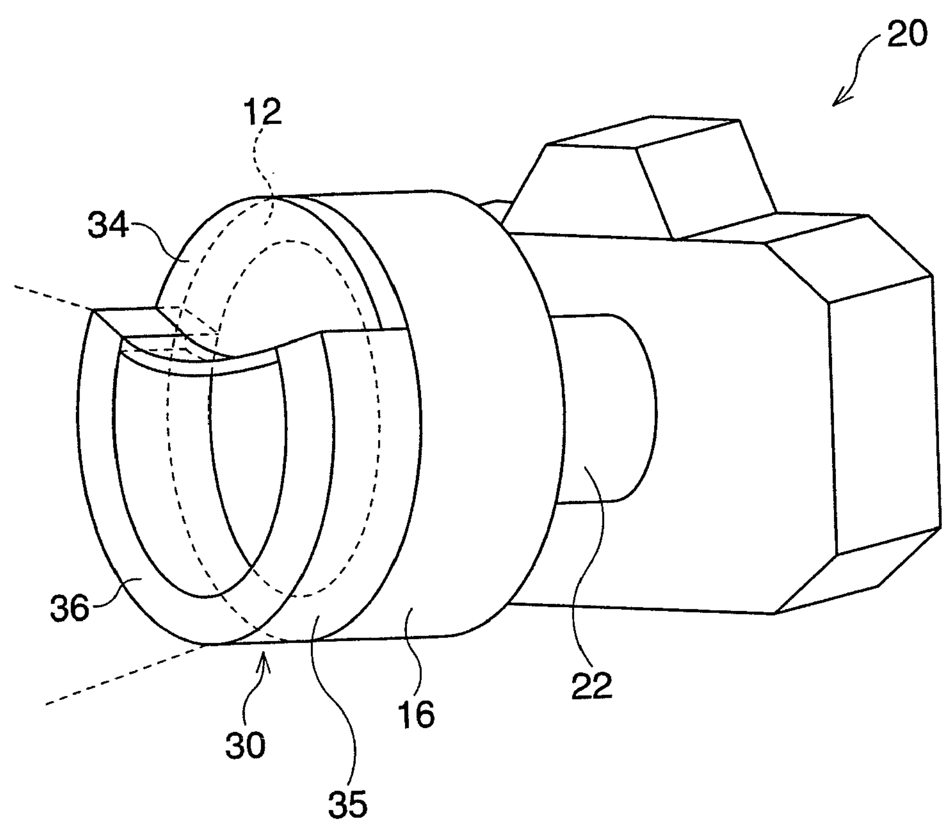
FIG. 3 is a perspective view of a light-shielding device and a ring flash of the second embodiment.
Figure 4:
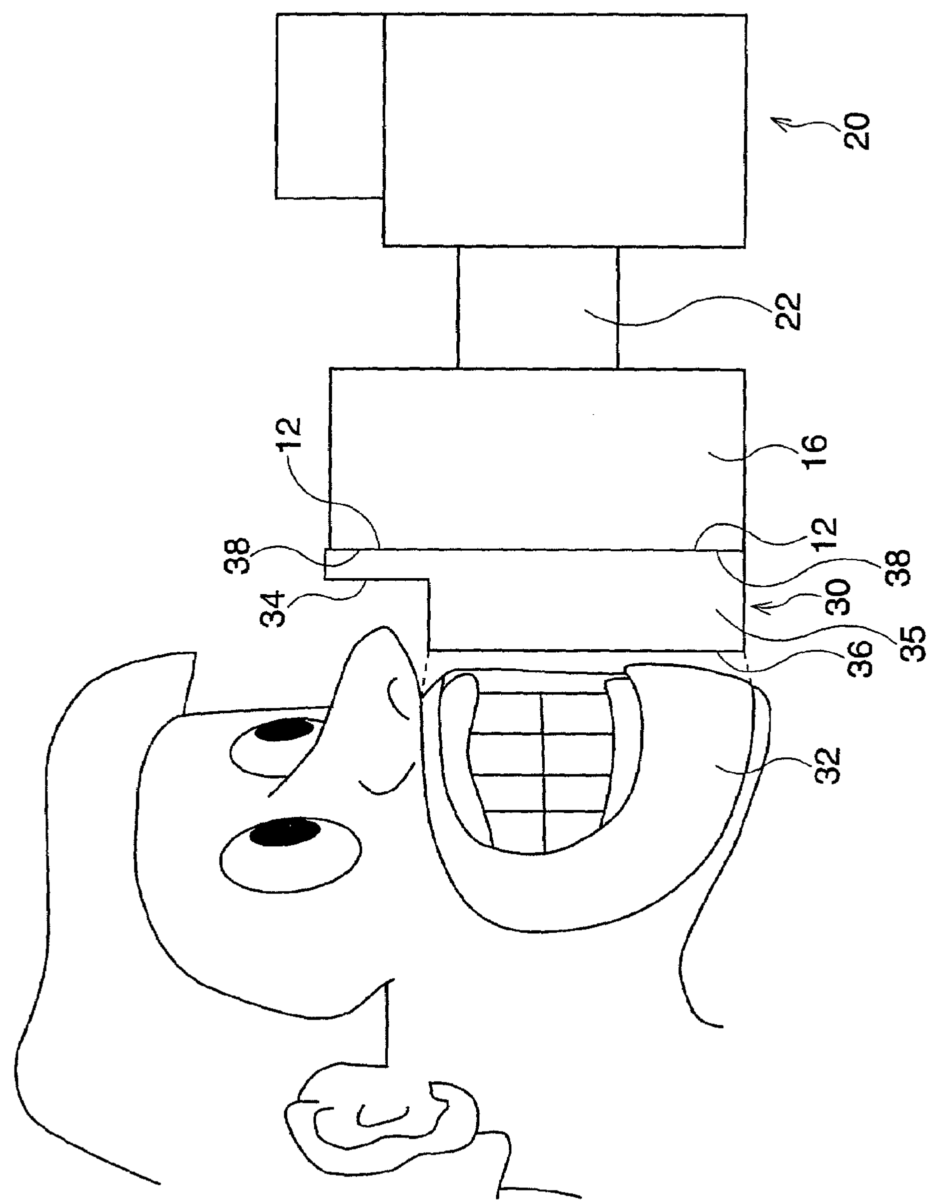
FIG. 4 is a side view of the light-shielding device and the ring flash of the second embodiment.

Hereinafter, the second embodiment is explained. FIG. 3 is a perspective view of a light-shielding device and a ring flash of the second embodiment. FIG. 4 is a side view of the light-shielding device and the ring flash. Note that in these following figures, the same components as those in the first embodiment have the same reference numerals, and the ring flash in this second embodiment, is conventional and different from the illuminating device 10 in the first embodiment.

The light-shielding device 30 is detachably attached to the ring flash 16 by a screw (not shown) when it is used for oral photography, so that a light-emitting surface 12 of the ring flash 16 having an O-shape is covered by the light-shielding device 30. The ring flash 16 is detachably connected to the periphery of a lens barrel 22 of the digital camera 20. The light-shielding device 30 is made of plastic, and includes a light-shielding surface 34 colored black for shielding the upper part of the light emitting surface 12, and a light-transmitting member 35. The light-transmitting member 35 is transparent for transmitting part of the illuminating light, and has an arc shaped light-transmitting surface 36.

The light-shielding device 30 has an attaching surface 38 that is attached to the light-emitting surface 12, when the light-shielding device 30 is attached to the ring flash 16 (see FIG. 4). The light-shielding device 30 is terraced in a direction parallel to an optical axis of the photographing optical system included in the lens barrel 22 of the digital camera 20, so as not to contact the nose of a patient when the digital camera 20 is used for close-up photography. That is, a distance between the light-shielding surface 34 and the attaching-surface 38 is shorter than a distance between the light-transmitting surface 36 and the attaching-surface 38. Because the light-shielding surface 34 is recessed, the light-shielding device 30 is prevented from interfering with a nose of a person being photographed in an oral photography.

Further, the emission of illuminating light toward the eyes or around the eyes of a patient is shielded by the light-shielding surface 34. And illuminating light transmitted by the light-transmitting member 35 having an arc shaped light-transmitting surface 36, exclusively illuminates the illuminating area 32 including the mouth of the patient and the periphery of the mouth under the nose, when the light-shielding device 30 is used for close-up photography.

In this second embodiment, the light-shielding device shields part of the illuminating light emitted by the illuminating device, so that a predetermined desired part of the patient as a subject, can be selectively illuminated. Further, the light-shielding device can avoid contact with the face of a patient when a close-up photography, or close observation is carried out.

The three dimensional shape of the light-shielding device 30, the plane shape of the light-shielding surface 34 and light-transmitting surface 36 are not limited to those in this second embodiment, although the plane shape of the light-transmitting surface 36 is preferably an arc shape as in the embodiment. These shapes can be modified according to the subjects, the shape of is the illuminating area 32, and so on.

Finally, it will be understood by those skilled in the art that the foregoing description is of preferred embodiments of the apparatus, and that various changes and modifications may be made to the present invention without departing from scope thereof.

What is claimed is:

1. A light-shielding device which is attachable to an illuminating device for oral photography, said light-shielding device comprising:

a light-shielding surface that shields illuminating light emitted by said illuminating device; and a light-transmitting member that transmits said illuminating light emitted by said illuminating device, and that has a light-transmitting surface having an arc shape, in order to exclusively illuminate a periphery of a mouth of a person being photographed, wherein said illuminating device is connected to a lens barrel provided on a camera, said light-shielding device is terraced in a direction parallel to an optical axis of said lens barrel, said light-shielding surface is recessed to prevent the light-shielding device from interfering with a nose of the person being photographed, said light-shielding device attaches to a light-emitting surface of the illuminating device, and a distance between the light-shielding surface and the light-emitting surface of the illuminating device in an axial direction of the lens barrel is smaller than a distance between the light-transmitting surface of the light-transmitting member and the light-emitting surface of the illuminating device in the axial direction of the lens barrel.

2. The light-shielding device according to claim 1, wherein a first distance between said light-shielding surface and an attaching-surface of said light-shielding device is shorter than a second distance between said light-transmitting surface and said attaching-surface.

3. The light-shielding device according to claim 1, wherein said light-transmitting member is transparent.

4. A light-shielding device which is attachable to an illuminating device for oral photography, said light-shielding device comprising:

a light-shielding surface that shields illuminating light emitted by said illuminating device, said light-shielding surface being recessed to prevent said light-shielding device from interfering with a nose of a person being photographed; and a light-transmitting member that transmits said illuminating light emitted by said illuminating device, and comprises a light-transmitting surface having an arc shape, wherein said illuminating device is connected to a lens barrel provided on a camera, said light-shielding device is terraced in a direction parallel to an optical axis of said lens barrel, said light-shielding device attaches to a light-emitting surface of the illuminating device, and a distance between the light-shielding surface and the light-emitting surface of the illuminating device in an axial direction of the lens barrel is smaller than a distance between the light-transmitting surface of the light-transmitting member and the light-emitting surface of the illuminating device in the axial direction of the lens barrel.

* * * * *